United States Patent Office 3,325,870
Patented June 20, 1967

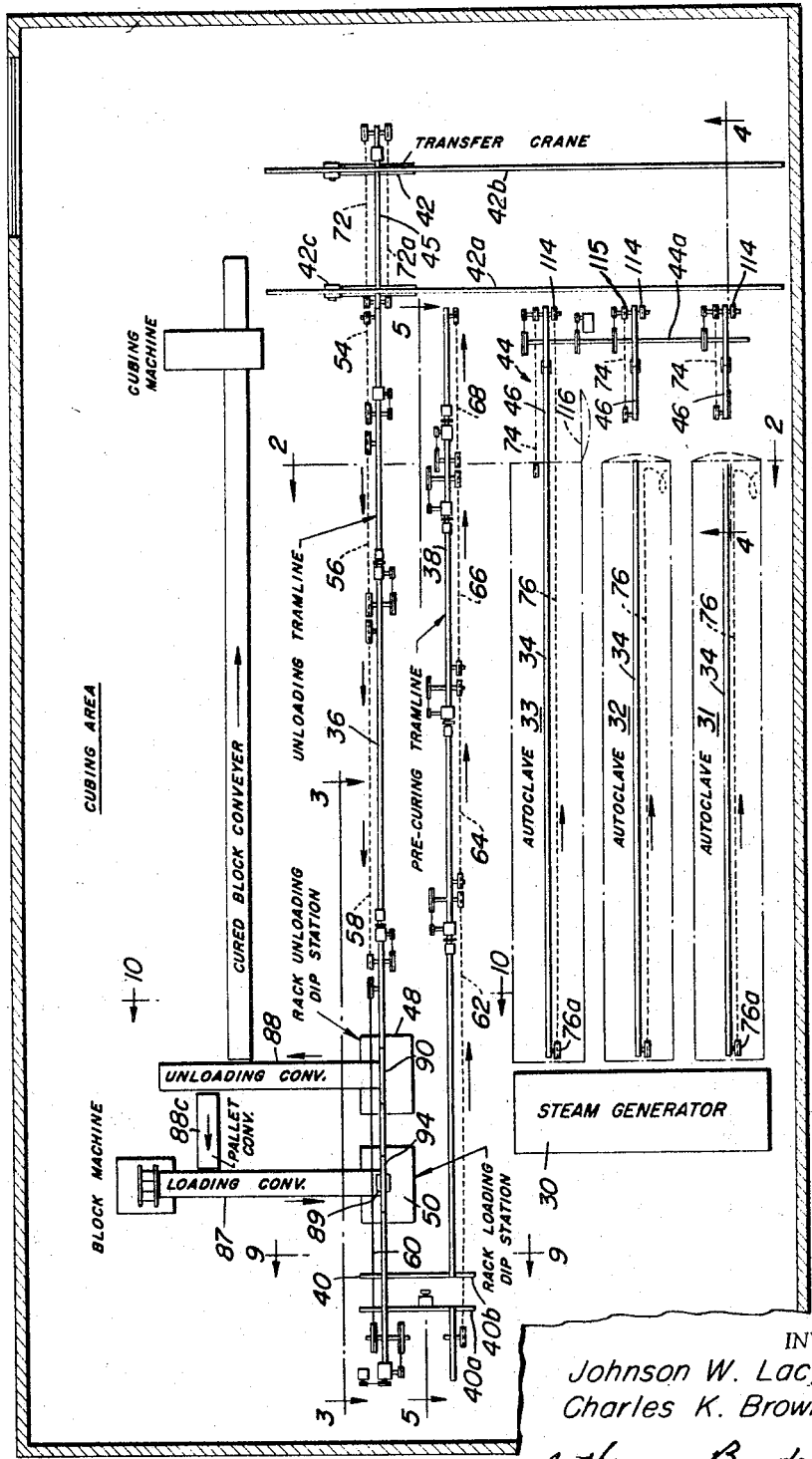

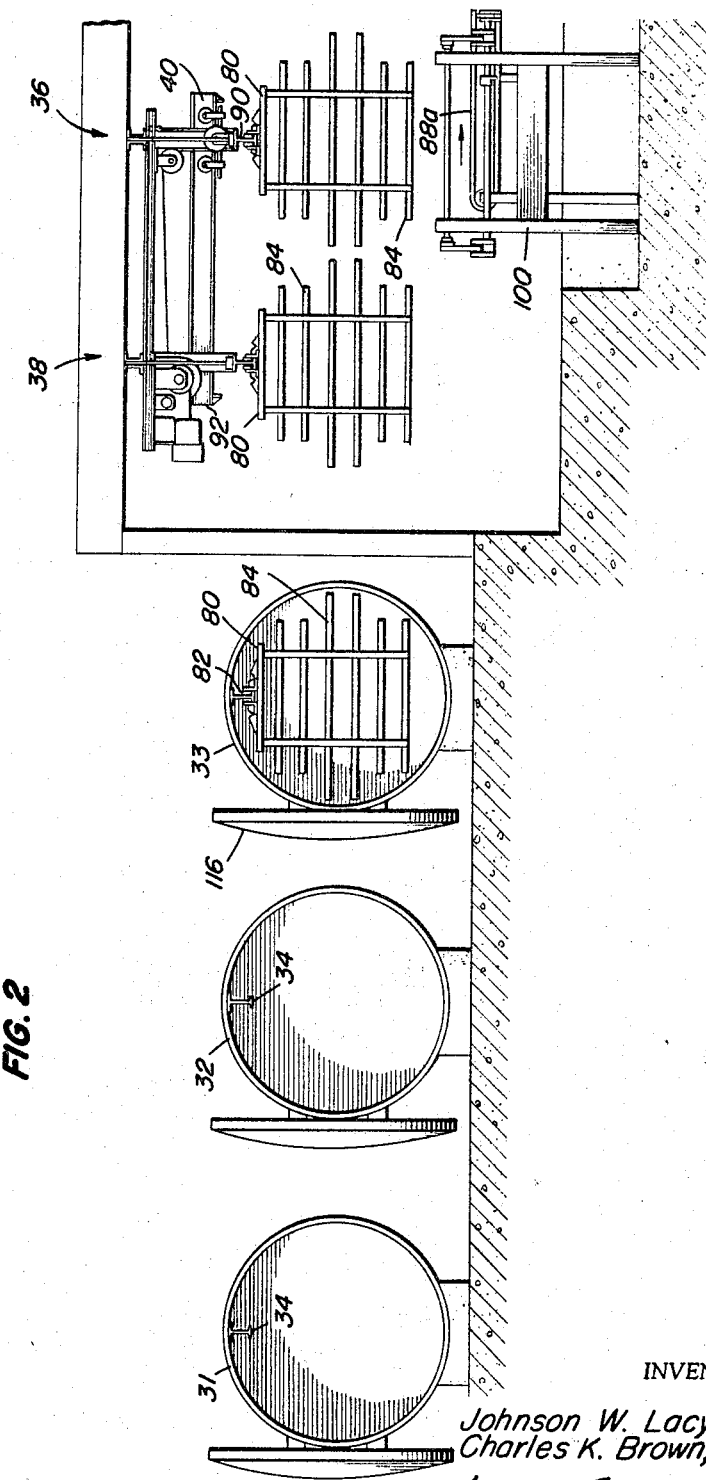

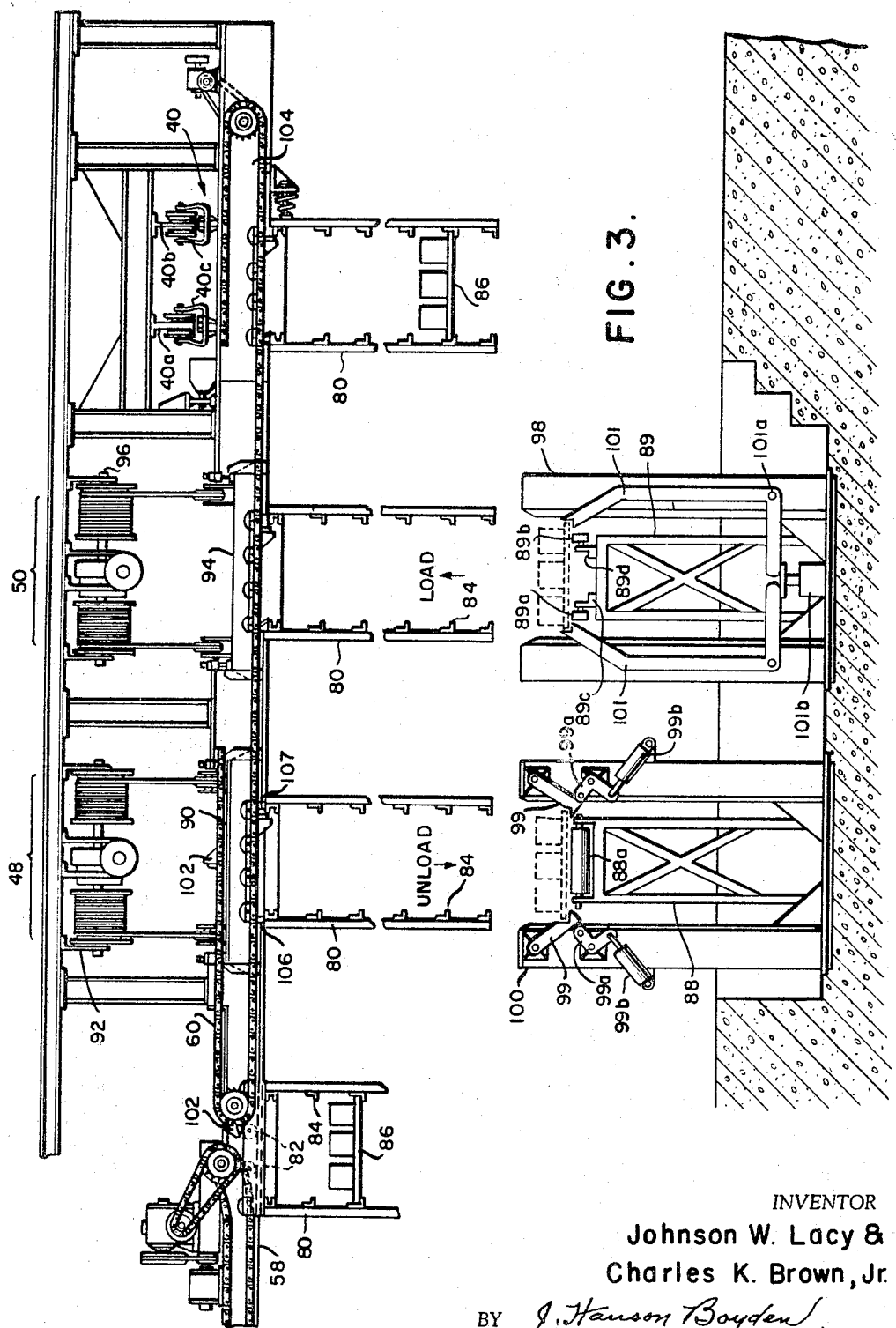

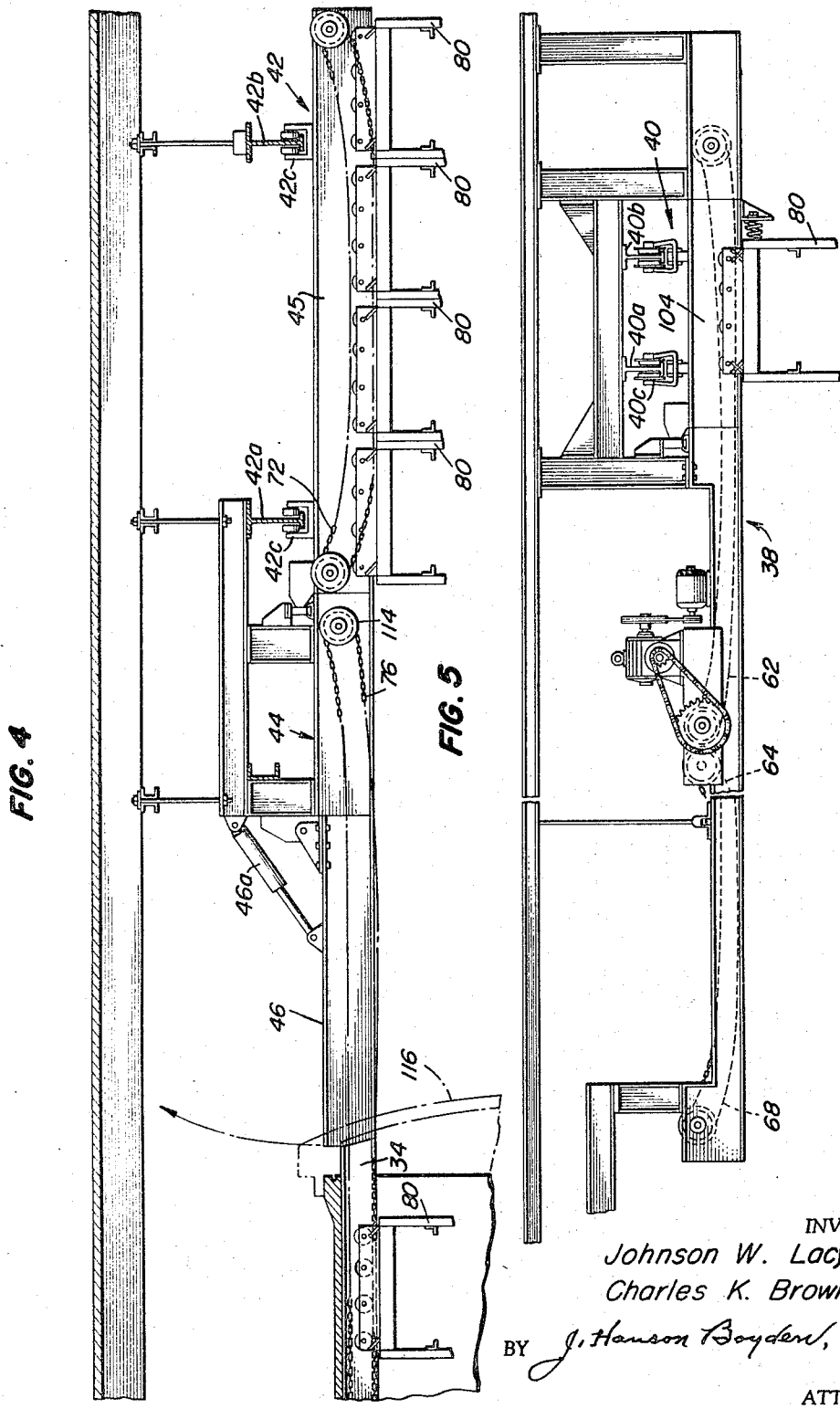

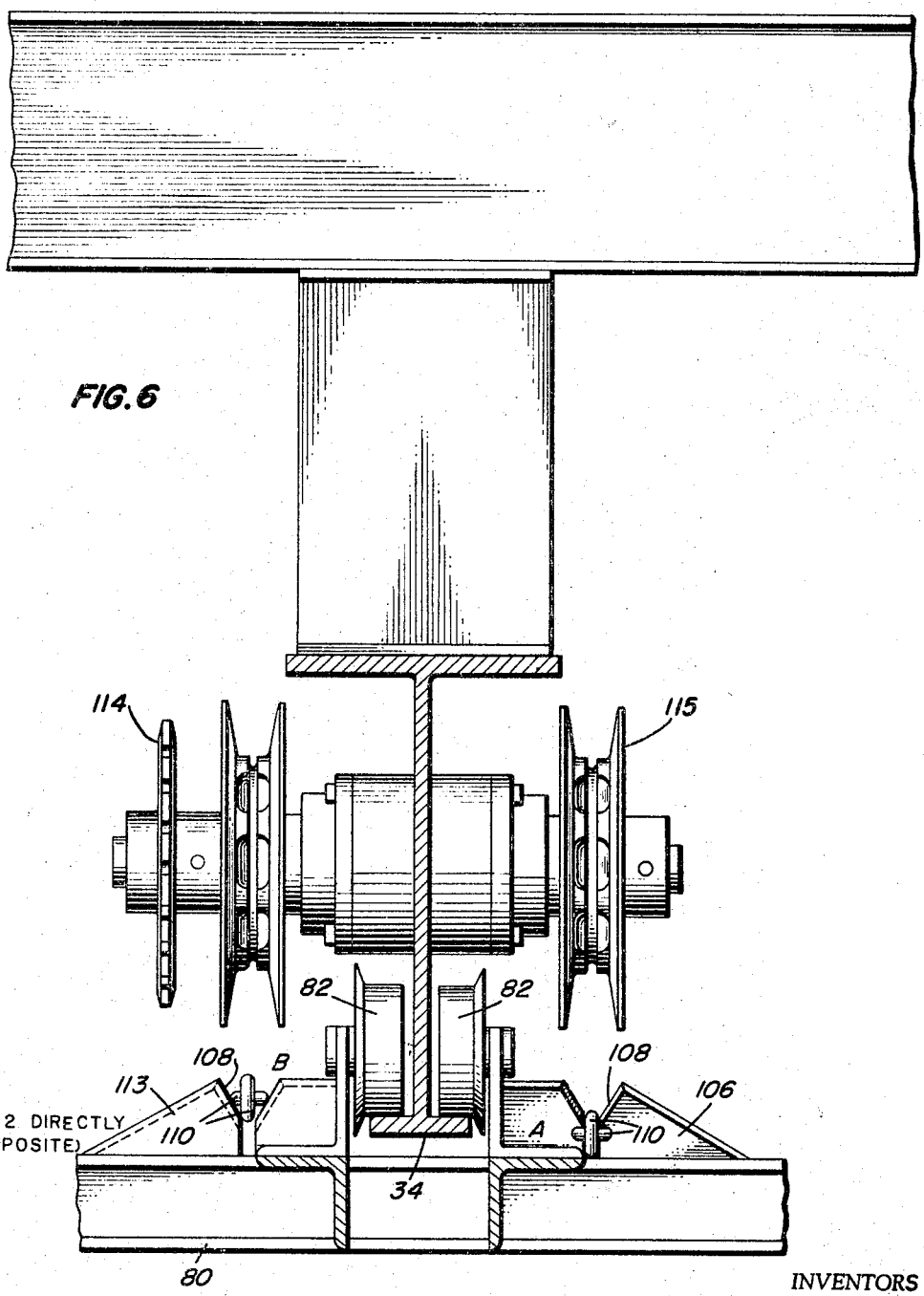

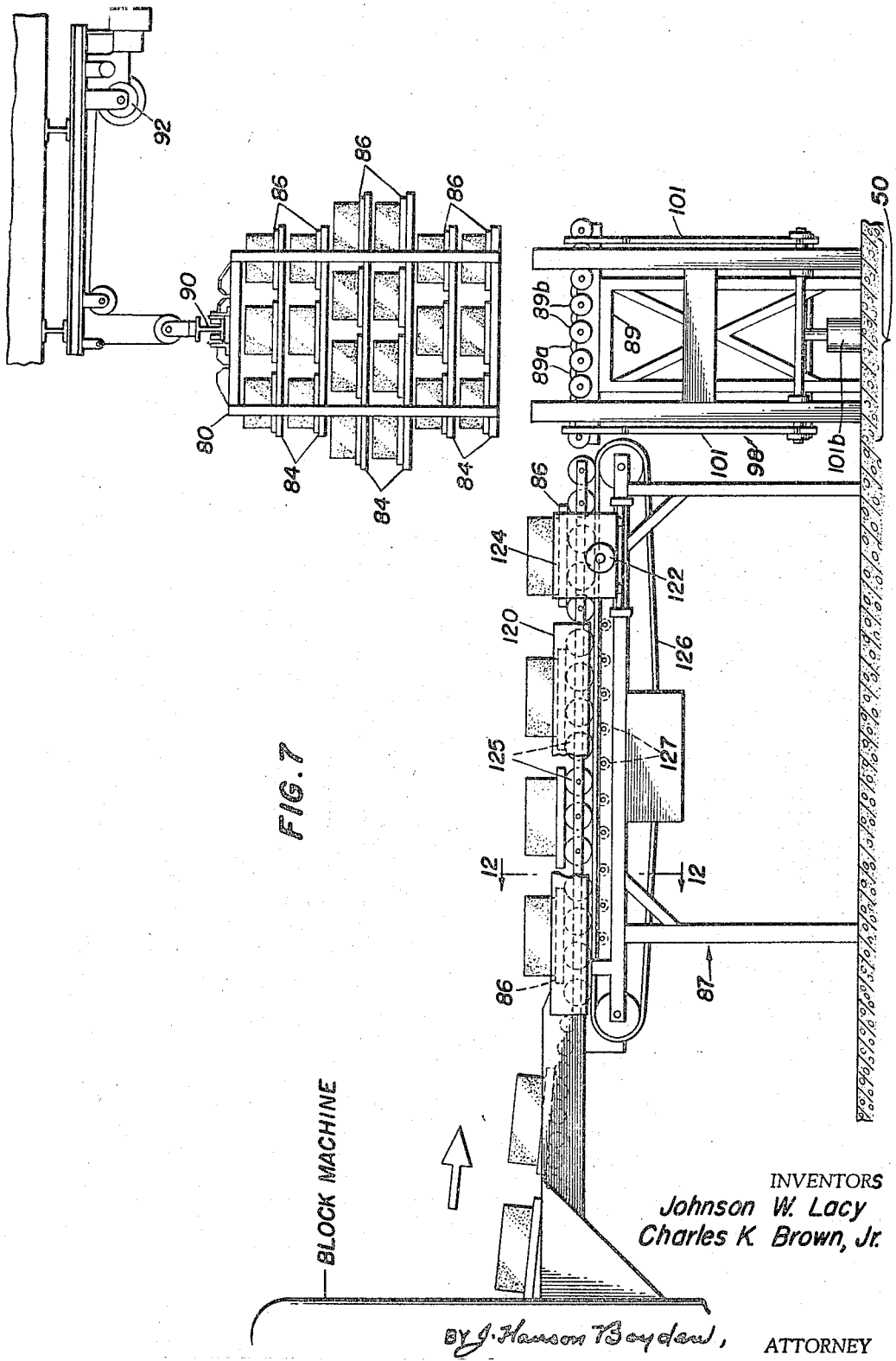

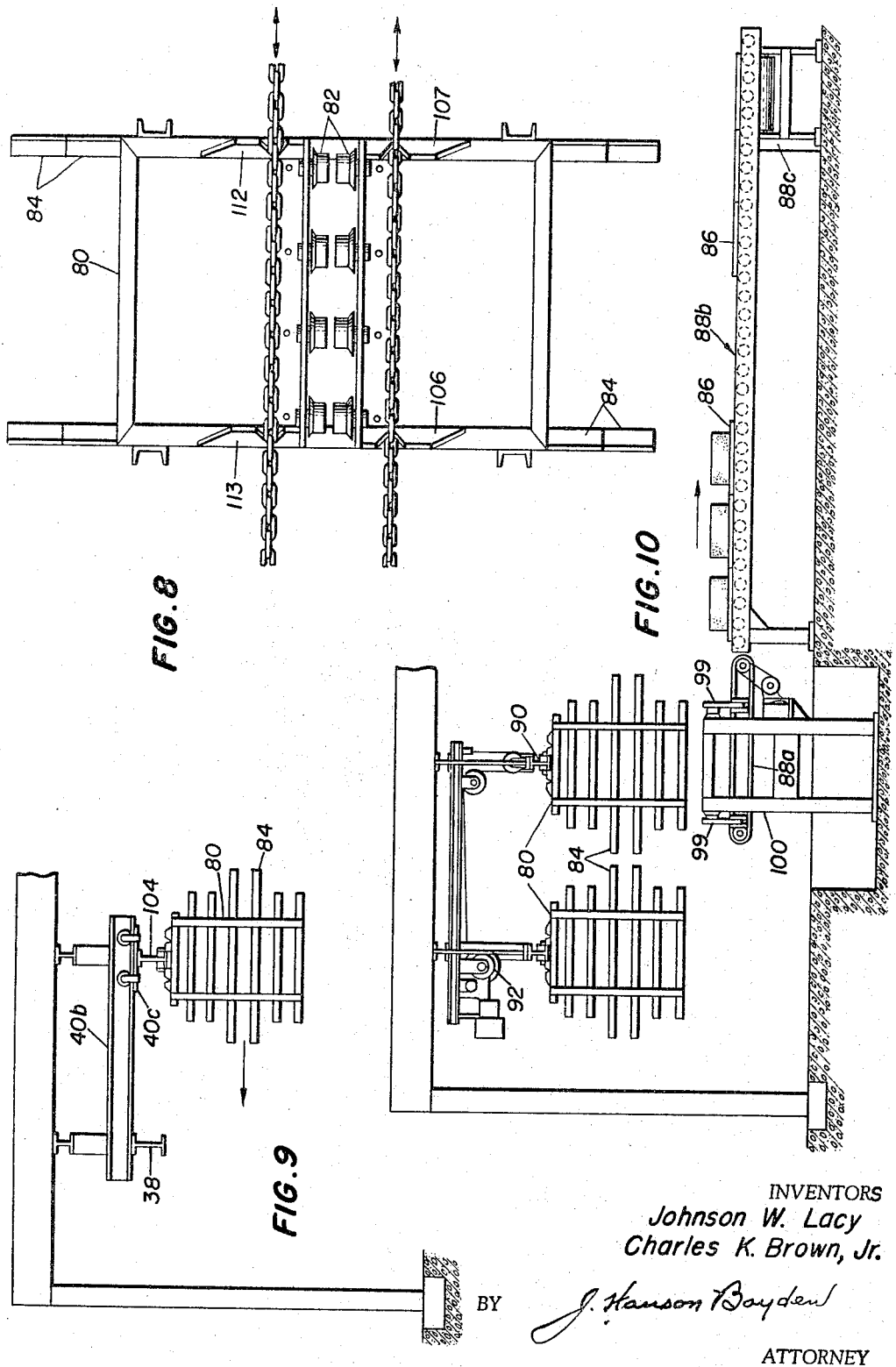

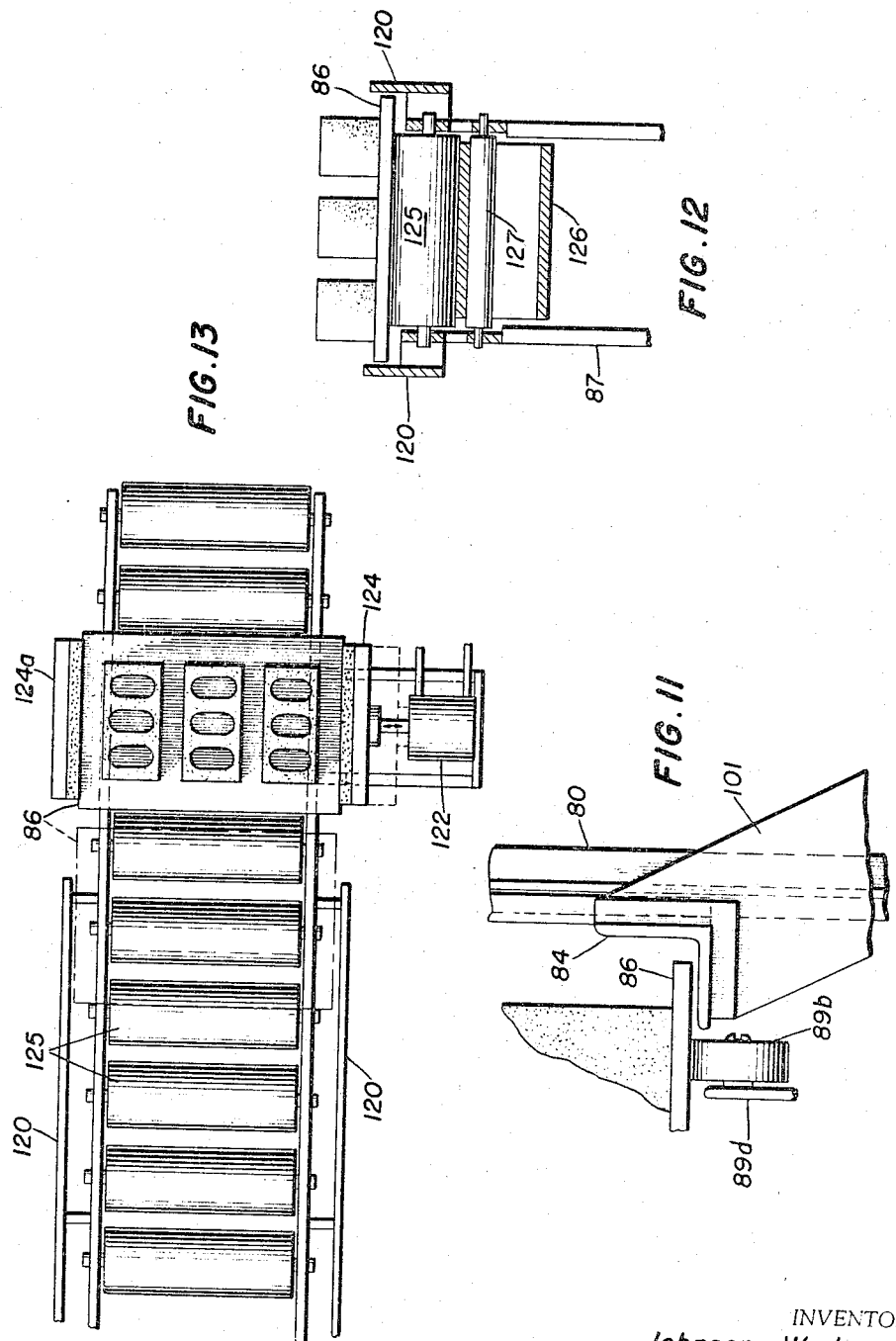

3,325,870
ARTICLE HANDLING AND TREATING SYSTEM FOR BLOCK MAKING
Johnson W. Lacy and Charles K. Brown, Jr., Richmond, Va., assignors to Concrete Building Units Co., Inc., Richmond, Va., a corporation of Virginia
Continuation of application Ser. No. 205,152, June 8, 1962. This application Mar. 15, 1965, Ser. No. 439,884
9 Claims. (Cl. 25—2)

This application is a continuation of application Ser. No. 205,152, filed June 8, 1962, now abandoned, which in turn is a continuation-in-part of application Ser. No. 835,614, filed Aug. 24, 1959, now abandoned.

This invention relates to material and article handling systems, and while it is applicable in general to the handling of material and articles of various kinds, it is particularly useful in the handling and conveying of concrete blocks, and the invention will be described in connection with such blocks, by way of example.

In the art of producing concrete blocks and the like, it is necessary that great care be exercised in handling the product in both the green and cured states. The conventional method and system for accelerating the curing of concrete articles is by means of steam chambers into which the concrete articles are loaded. Heretofore, the usual method of handling the concrete articles from the molding machine to and from the steam chambers has been by means of lift trucks. It has been found, however, that, because of breakage or attrition of the concrete articles, the floor of the plant soon becomes covered with sand, gravel, concrete fragments and dust, and this abrasive material finds its way into the wheel bearings of the trucks, with the result that such bearings are subjected to excessive wear, thus entailing a high cost of maintenance.

It is an important object of the present invention to eliminate the use of such trucks, and to this end the invention contemplates the provision of elevated monorail tramlines throughout the plant, from which tramlines racks carrying the concrete articles are suspended, and along which they travel.

Another object of the invention is to provide a co-operative assembly for charging the racks of green concrete articles into the steam chambers or autoclaves, and for removing the racks of cured articles therefrom, in an efficient and labor-saving manner.

A further object of the invention is to devise improved automatic means for loading green concrete articles, such as blocks, on to the racks, and for unloading the cured articles from such racks.

Other objects of this invention are to provide an automatic block racking system which will materially reduce the cost of producing concrete blocks and which will modernize the method and apparatus for producing, curing, and handling concrete blocks.

These and other objects and advantages of this invention will become more readily apparent and understood from the following accompanying specification and drawings in which:

FIG. 1 is a plan view partially in cross section, of a mechanized concrete block manufacturing system incorporating features of this invention;

FIG. 2 is an end view taken in the direction of the arrows 2—2 of FIG. 1 at the face of the autoclaves;

FIG. 3 is an enlarged cross section taken in the direction of the arrows 3—3 of FIG. 1 illustrating dip stations and a short transfer crane;

FIG. 4 is an enlarged cross section taken in the direction of the arrows 4—4 of FIG. 1 illustrating a charging conveyor for a hinged autoclave, together with a long transfer crane;

FIG. 5 is an enlarged cross section taken in the direction of arrows 5—5 in FIG. 1 showing a pre-curing tramline together with the short transfer crane;

FIG. 6 is an enlarged end view, partially in section, of a portion of a rail supported rack and a chain drive sprocket therefor;

FIG. 7 is a side elevation of the loading conveyor from the block machine to and including the loading dip station showing a loaded rack being raised thereon;

FIG. 8 is a plan view, on a somewhat enlarged scale, of one of the article carrying racks;

FIG. 9 is a section along the line 9—9 of FIG. 1, looking in the direction of the arrows;

FIG. 10 is a section along the line 10—10 of FIG. 1, looking in the direction of the arrows;

FIG. 11 is a fragmentary elevation on an enlarged scale, showing a detail of the loading machine illustrated in FIG. 3;

FIG. 12 is a transverse section, on a somewhat enlarged scale, substantially on the line 12—12 of FIG. 7, looking in the direction of the arrows; and FIG. 13 is a plan view, on a similar scale, of the conveyor shown in FIG. 7.

Referring now to FIGS. 1 and 2 of the drawings, block curing means, such for example, as a plurality of parallel, cylindrical autoclaves 31, 32 and 33 are diagrammatically shown. These autoclaves 31, 32 and 33 are arranged to be supplied with steam under pressure from a steam generator 30. Each autoclave 31, 32 and 33 is provided lengthwise with a section of the overhead monorail 34, of the cross-sectional shape shown in FIG. 6. An unloading tramline 36 and a pre-curing tramline 38, both constructed of an elevated monorail 34, as shown best in FIGS. 1, 2 and 5, are provided and are shown as disposed side by side in spaced relation and in parallel relationship with autoclaves 31, 32 and 33 and with each other.

A short transfer crane 40 bridges one end of the pair of tramlines 36 and 38, while a long transfer crane 42 is placed adjacent their opposite ends at right angles thereto as shown in FIGS. 1 and 2.

The short crane 40 comprises a pair of monorail sections 40a and 40b, along which run a pair of trolleys 40c, carrying a monorail section 104, which is capable of being moved into registry with either of the tramlines 36 or 38. The long transfer crane 42 comprises a pair of elevated monorails 42a and 42b, along which run trolleys 42c carrying a bridge monorail 45. The monorails 42a and 42b extend across the ends of the tramlines 36 and 38, so that the bridge 45 may register with either. These monorails also extend across the ends of charging monorails 44 disposed in front of each autoclave. The monorails 44 are provided with hinged span tracks 46 joining each autoclave monorail 34, as shown in FIGS. 1 and 4. These span tracks 46 may independently be raised clear of the autoclaves 31, 32 or 33 as by means of power cylinders 46a to permit their doors 116 to be closed, as best illustrated in FIGS. 1 and 4.

The tramline 36 is provided with a rack unloading dip station 48, and a rack loading dip station 50, with the stations 48 and 50 being provided with hoist rail sections 90 and 94, respectively, as shown in FIGS. 1 and 3. A motor driven endless roller link drive chain 60 is provided for that end of the tramline 36 adjacent the dip stations 48 and 50. In addition, the tramline 36 has three serially arranged motor driven single endless chain drives 54, 56 and 58, as shown best in FIGS. 1 and 3. The tramline 38 is also provided with single endless motor driven chain drives 62, 64, 66 and 68, as shown in FIGS. 1 and 5. The long transfer crane 42 is provided with an endless reversible double chain drive 72 and 72a, as illustrated in FIGS. 1 and 4.

Each hinged span track 46, as shown in FIG. 1, is provided with an endless reversible single chain drive 74 but which may be operated double chain in conjunction with an endless pull chain 76 (see FIG. 4). Chain 76 extends from within each of the autoclaves 31, 32 and 33 and is used only during unloading periods thereof as will be related subsequently.

As shown best in FIGS. 2, 3, 6 and 8, a plurality of racks 80 are arranged to depend from the monorails and travel along the same by means of trolley wheels 82. Racks 80 are of inverted U-shape. Each rack 80 is provided with a plurality of support angles 84 at each end to loosely receive the ends of pallets 86 for transporting the concrete blocks thereon. A further function of the inverted U-shaped racks 80 is to allow the racks 80 to straddle a pallet unloading conveyor 88 and a loading conveyor 89 as shown in FIGS. 1 and 3 and as will be described subsequently.

A section 90 of the tramline 36 is arranged to be raised or lowered by a hoist 92 in unloading dip station 48, and a similar section 94 may be raised or lowered by a hoist 96 in loading dip station 50, as shown in FIGS. 2 and 3. A loading machine 98 is located directly under hoist 96 and functions to guide and level one of the racks 80 as it is positioned over the same. An unloading machine 100 is likewise provided under hoist 92, and it guides and levels each rack 80 over the same.

The conveyor at the unloading station 48 is designated generally by the reference character 88 in FIGS. 1 and 3. By reference to FIG. 10, it will be seen that this conveyor is made up of a "live" or motor driven section 88a and a "dead" or roller section 88b. The pallets and blocks, as they are taken off of the lowering racks 80, are delivered by the live section 88a on to the roller section 88b, and pushed along the latter to the discharge point. The conveyor from the block machine to loading station 50 is designated generally by the reference character 87, in FIGS. 1 and 7. This conveyor comprises a set of carrying rollers 125 positioned between guide members 120, on which rollers the pallets 86 ride between said guide members, such rollers being supported on the upper run of a drive belt 126, which drive belt is itself supported on a series of rollers 127.

Disposed at the right-hand end of the conveyor 87, as viewed in FIG. 7, is a transversely operating clamping device, best shown in FIG. 13. This comprises a movable clamping plate 124 on one side, and a fixed clamping plate 124a on the opposite side. The movable clamping plate is pneumatically actuated as by means of an air cylinder 122. The pallets 86 are gripped between these clamping plates, at times, thus arresting their travel along the conveyor.

Just beyond this clamping or braking device is a roller conveyor, designated in its entirety by the reference character 89. As shown in FIGS. 3 and 11, this conveyor preferably comprises two spaced sets of fixed rollers 89a and 89b, mounted on angle bars 89c and 89d.

The unloading machine 100 is provided with two opposing pairs of notched pawls 99, as shown best in FIG. 3, which are pneumatically operated in synchronism as by means of cams 99a, actuated by air cylinders 99b so as to extend inwardly and receive pallets resting upon one opposing pair of support angles 84 of a lowering rack 80 at a time. The loading machine 98, on the other hand, is provided with two opposing pairs of notched arms 101, pivoted at 101a, also pneumatically operated as by means of an air cylinder 101b in extending or retracting synchronism, to cooperate with pallets resting upon a pair of support angles 84 of a raising rack 80 in similar rack leveling action to that of pawls 99.

The roller link chain drive 60, as shown in FIGS. 1 and 3, propels the racks 80 by means of a series of dogs 102. These dogs 102 are spaced at intervals corresponding to the locations of the centers of track sections 90 and 94, and of a track 104 which is a part of the short transfer crane 40. A pair of clips 106 and 107, as shown best in FIGS. 1 and 6, is provided at one side on the top of each rack 80. The dogs 102 impinge against the upstream clip 107.

In the case of the remaining drives, namely, chain drives 54, 56, 58, 62, 64, 66, 68, 72, 74 and the pull chain 76, as shown in FIGS. 1, 3, 4 and 5, all are so-called "log" chains made up of straight, flat links lying alternately in planes at right angles to each other. A Y-shaped notch 108 is provided in each clip 106 and 107, as shown best in FIG. 6, to receive the typical chain links designated 110. Another pair of similar clips 112 and 113 are mounted at the other side on the top of each rack 80. It should be noted that, as shown in FIG. 6, clips 106 and 107 are tilted toward the viewer while clips 112 and 113 are tilted away therefrom. The location and direction of tilt of the two pairs of clips on the racks 80 is also clearly shown in FIG. 8. Also as shown in FIG. 6, the upper outer edges of clips such as 106 and 113 are transversely sloping, for a purpose described later. This construction causes the chain links 110 to engage the Y-shaped notches as at A and propel the rack, when the chain has movement in one direction relative to the rack, and causes the chain links to ride up out of the notches as at B and become disengaged therefrom when the relative movement between chain and rack is in the other direction. Thus, under some conditions, the chain may slide freely over the racks without propelling the same, or, if the racks tend to overrun the chain, they may coast along freely under it. While the construction of the drive for the chains 110, as above set forth, has been described in connection with FIG. 6, for simplicity of illustration, in which figure the drive sprocket 114, for use in unloading the autoclaves, is also included, it will be understood that this construction of chain drive is particularly useful in propelling the racks along the tramlines 36 and 38 of FIG. 1. The tilted feature of the clips 106, 107, 112 and 113 allows the rack receiving chain drive 62, of FIGS. 1 and 5, to engage each rack 80 after its lateral transfer by the short crane 40. As shown in FIGS. 4 and 5, the short crane 40 moves one rack 80 at a time. However, the long crane 42 has a capacity of handling four or more racks 80 at one time.

FIGS. 1 and 4 illustrate how the endless pull chain 76 runs over a pulley 76a at the rear end of an autoclave, and may be manually looped over a drive sprocket 114 on the autoclave charging conveyor 44 when an autoclave door 116 is opened. Also shown is the arrangement by which the hinged span track 46 may be raised as by means of a power cylinder 46a to clear the door 116 when it is closed.

Having described the mechanism of the invention, the function of the various drives and the steps of an operating cycle will now be discussed.

By suitably positioned switches, well known to those skilled in the art, the chain drive 72 and 72a of FIGS. 1 and 4 loads and unloads the racks 80 from the long crane 42 which is controlled automatically by positioning of crane, or by manual control of the operator.

The chain drive 54 crowds the racks 80 of cured blocks into the area of the drive 56 of the tramline 36 and it runs continuously. The chain drive 56 crowds the racks 80 of cured blocks along the tramline 36 into the area of drive 58, and it runs continuously except when the area of the drive 58 is overloaded with racks 80 and the line of racks 80 is pushed into a switch which opens the circuit as long as a rack 80 is against the switch.

The chain drive 58 crowds racks 80 into the pick-up area for the indexing roller chain drive 60, moving one rack 80 the length of a rack per rack loading cycle, and it is stopped by the presence of a rack 80 at the input to drive 60. The roller chain drive 60 is referred to as an "indexing" drive because it serves to move the racks through a definite predetermined distance in proper spaced relation.

The chain drive 60 indexes three racks 80 at a time through the dip stations 48 and 50. As a result, it moves a loaded rack 80 of cured blocks into position to be unloaded over the unloading conveyor 88 shown in FIGS. 1 and 3. The chain drive 60 also simultaneously moves an emptied rack 80 over the loading machine 98 to be loaded, and it moves a reloaded rack 80 of green blocks on to the short crane 40. The chain drive 60 is started by a series of four interlocked function-accomplished switches and it is stopped by the presence of a rack 80 at the short bridge crane 40.

The short bridge crane 40 transports racks 80 of green blocks from the loading area to the tramline 38, as shown best in FIGS. 1, 2 and 9. Forward and reverse of the crane 40 are automatically controlled by the entry and discharge of racks 80, respectively. The chain drive 62, of FIGS. 1 and 5, moves the loaded racks 80 off of the laterally shifted short bridge crane 40 and down the tramline 38 to the area of the drive 64. Chain drive 62 is started by the shifted short bridge crane 40 and it is stopped after the rack 80 clears the crane 40.

The chain drive 64 is relatively short and it is used to crowd the racks 80 into an accumulated group on the tramline adjacent chain drive 66, large enough to fill an autoclave, such as 31, 32 and 33. The chain drive 64 runs continuously and it will stop only when the tramline adjacent the drive 66 is loaded with racks 80.

The chain drive 66 moves racks 80 into the area of the drive 68 as required and it runs continuously except when stopped by the chain drive 68 becoming full.

The chain drive 68 loads one crane load of four (4) racks 80 in a relatively quick time. This chain drive 68 is started automatically by the moving of crane 42 into position to receive the racks or by manual control of the operator, and it is stopped when the crane 42 is loaded with racks 80. When the area of drive 68 is cleared of racks 80, the drive 66 is allowed to refill it for the next loading cycle of the long transfer crane 42.

When the rail 45 of crane 42 has moved into registry with the rail 44 of one of the autoclave loading conveyors, the forward movement of the chain drive 72 and 74 loads the autoclaves 31, 32 and 33 with racks 80 of uncured blocks, it clears the area in front of the autoclaves 31, 32 and 33 for reception of the following or succeeding loads of racks 80 from the long transfer crane 42. Chain drive 74 runs continuously during the loading cycle of each autoclave 31, 32 and 33. Racks 80 are driven forward by the short chain of chain drive 74 on the right side of each autoclave 31, 32 or 33, into the autoclave. The short chain of the chain drive 74 disengages from racks 80 at the entrance to respective autoclaves 31, 32 and 33.

Racks 80 are crowded together as they are thus pushed onward into the autoclaves 31, 32 or 33.

By looping the endless pull chain 76 around the sprocket 114 and common drive shaft 44a (FIG. 1), the cured racks 80 are withdrawn from the autoclave 31, 32 or 33 and are unloaded onto the long bridge or transfer crane 42 for transfer to the tramline 36 on the way to the unloading machine. The pull chain 76 and its drive are controlled by the position of the long transfer crane 42 for transfer to the tramline 36 on the way to the unloading machine 88. The pull chain 76 and its drive are controlled by the position of the long transfer crane 42 or by the operator thereof. The long transfer crane 42 moves as required to unload or reload the autoclaves 31, 32 or 33, either manually or automatically.

There are two cycles within the overall operating cycle of the system, namely, the unloading and loading cycle of the autoclaves 31, 32 or 33, and the unloading and loading cycle of the racks 80. Starting with the three autoclaves 31, 32 and 33, full of racks 80 loaded with blocks being cured and with precuring tramline 38 loaded with thirty-six (36) racks 80 ready for curing, the steps in the autoclave unloading and loading cycle will now be described in connection with FIGS. 1 to 6.

The autoclave 33, for example, is exhausted of steam, and the door 116 thereof is opened. The hinged span track 46 is then lowered to align with the monorail 34 in the autoclave 33. The four-rack capacity long transfer crane 42 is then lined up with the autoclave 33. The rack pull chain 76 is next manually placed over sprocket 114, of FIGS. 1, 4 and 6, next to the long transfer crane 42. The operator then works the controls to pull thirty-six (36) racks 80 from the autoclave 33 toward the long transfer crane 42. When three and one-half (3½) racks 80 have been pulled onto the long transfer crane 42, the drive shaft 44a is automatically stopped by a properly located limitswitch and the rack loading chain drive 72a then starts and finishes pulling the four (4) racks 80 onto the long transfer crane 42. This leaves a gap between the remaining thirty-two (32) racks 80 and the transfer crane.

The bridge monorail of the long transfer crane 42 is then moved into alignment with the unloading tramline 36. After a safety interlocking of the long transfer crane 42, the reversible chain drive 72 is then energized, and the four (4) racks 80 are moved off of the long transfer crane 42 and onto the tramline 36 adjacent the accumulating chain drive 54. The accumulating chain drive 54 is automatically stopped when it has moved up four rack lengths of racks 80 to make space for the next four (4) racks 80 to be brought from the autoclave 33 being unloaded.

The long transfer crane 42 then returns to the autoclave 33, and receives four (4) more racks 80 for discharge onto the tramline 36 at the accumulating chain drive 54. This cycle takes place nine (9) times until all thirty-six (36) racks 80 have been removed from the autoclave 33.

To complete the unloading and loading cycle of the autoclave 33, the long transfer crane 42 is then moved from registry with tramline 36 (at the completion of its ninth autoclave-to-tramline cycle) to the pre-curing tramline 38 and is interlocked there.

The section of the chain drive 68 of tramline 38 now operates to run four (4) racks 80 of green blocks onto the long transfer crane 42. This four-rack loading section of chain drive 68 is automatically refilled during the interval of movement of the long transfer crane 42, preparatory to the next loading operation. The long transfer crane 42 then moves to the empty autoclave, in this case autoclave 33, and quickly discharges its four racks 80 onto the monorail 44 of the autoclave 33 and returns to the tramline 38 for four more racks 80. This cycle is repeated nine times until the autoclave 33 is reloaded with racks 80.

The actual loading of the autoclave 33 is done by the ten-foot long autoclave charging chain drive 74. Each time four racks 80 are discharged from the long transfer crane 42 onto the charging conveyor monorail 44 for autoclave 33, the drive chain 74 slowly and gently moves and pushes the accumulated racks 80 into the autoclave 33 and makes space for the next four racks 80 coming over on the long transfer crane 42 from the tramline 38.

The pull chain 76 for the autoclave 33 is unlooped from the drive sprocket 114 and allowed to drop down over the end rack 80. The hinged span track 46 is then raised up and the door 116 for the autoclave 33 is closed, thus completing the unloading and loading cycle thereof. The unloading and loading cycle of an autoclave such as 31, 32 or 33, usually takes between twenty (20) to thirty (30) minutes.

The autoclave loading and unloading cycle in the overall production cycle of the blocks has just been described in step-by-step sequence. The following discussion will now be devoted to describing the unloading and loading cycle for the racks 80, which results in loading on to the racks the green blocks to be treated or cured in the autoclaves, and in unloading the cured blocks from the racks.

Each indexing movement of the roller link drive 60 which moves the racks 80 into exact position for unloading and reloading thereof leaves a space at its entering end. This space is filled automatically each time by a forward movement of the feed chain drive 58 moving a rack 80 to a limit switch stop. This limit switch stop is so located that the rack 80 will be in position to be picked up by the next forward movement of the indexing conveyor drive 60, and carried to the unloading station 48. (See left end of FIG. 3.)

At the unloading dip station 48, the rack 80 is lowered by the electric hoist 92, as shown in FIGS. 2, 3 and 10 into the unloading machine 100 which allows the rack 80 to be lowered one support angle 84 at a time, straddling continuously moving unloading endless conveyor 88a which delivers the pallets 86 of the cured blocks on to the roller conveyor 88b which carries them past a block unloading position where the cured blocks are either manually or automatically removed from the pallets 86 and placed in cubes. The stripped pallets 86 are fed by pallet conveyor 88c back to the block machine for re-use.

It is to be noted here that a rack 80 containing cured concrete blocks can thus be moved over a moving unloading conveyor 88a in unloading machine 100, which positions and levels the rack while being unloaded. The rack 80 is positioned by the guide system used and it is supported accurately at the proper level by air actuated swinging pawls 99 which receive the rack 80 at each individual rack unloading level. Thus, variations in rack dimensions do not affect the unloading operation.

The unloaded rack 80 is then raised back to the tramline 36 level and indexed a predetermined distance to the rack loading dip station 50 over the roller conveyor 89. The rack 80 is then immediately lowered into the guiding and leveling loading machine 98 until the top deck or support angle 84 is at a level to receive three (3) pallets 86 of blocks. The rack 80 is then stepped up to the next level or support angle 84 where it receives three (3) more pallets 86 of blocks. The third and fourth level receives four (4) pallets 86 of blocks from the loading conveyor 87; and the fifth and sixth level, three (3) pallets each. In all, twenty (20) pallets are loaded on each rack 80. When the sixth deck of the rack 80 is loaded with pallets 86, a final lift is made to bring the rack 80 up to the level of the tramline 36.

FIG. 7 illustrates the discharge of the formed green blocks or other concrete articles from the block machine onto the loading conveyor 87 where the loaded pallets 86 are moved onward and are directed by a pair of guides 120 into the pallet clamping device 124, 124a (see FIG. 13). The clamp actuator cylinder 122, interlocked with suitably placed electric switches, halts or releases the pallets 86 before they are allowed to pass onto the dead roller conveyor 89 from the loading conveyor 87. In this manner, it is assured that each level defined by support angles 84 of the rack 80 being raised is fully charged with the required quantity of pallets 86 as previously mentioned. Furthermore, the pallets 86 are thus withheld from the rack loading machine 98 while the rack 80 is being lowered or is changing levels in the loading process.

Other switches are suitably located in both the dip stations 48 and 50 of FIGS. 1 and 3. These switches (not shown) are operated by the pawls 99 and arms 100 of FIG. 3, the slackening and tightening of the hoist cables, and by the downward and upward movements of the support angles 84, of FIGS. 2, 3 and 7, to sense the dynamic status, position, and capacity of each level of the rack 80.

Thus, the hoist 92 and 96, of FIGS. 2 and 3, are made to cooperate, respectively, with the notched pawls 99 and notched arms 101 to vertically index and hold the racks 80 for unobstructed automatic entry or removal of the groups of pallets 86 thereto or therefrom and the initial lowering and the final raising of the racks 80.

The indexing roller link drive 60 now moves the loaded rack 80 to the short transfer crane 40, and simultaneously, it moves an empty rack 80 into the loading dip station 50 and a full rack to the unloading station 48. The loaded rack 80 on the short crane 40 is immediately carried over to the tramline 38 where the short crane unloading chain drive 62 engages the Y-shaped notch 108 on top of the rack 80 and pulls it from the short crane 40 and slowly carries it along the pre-curing tramline 38. The purpose of making the outer upper edge of clip 106 on a slope or incline, as shown in FIG. 6, is to enable the chain drive 62 (FIGS. 1 and 5) to ride up into the Y-shaped notch 108 as the crane, carrying the rack, moves laterally into alignment with the tramline 38. (See also FIG. 9.)

During the loading phase of the autoclave 33, of the over-all cycle of operations, four (4) racks at a time are drawn from the pre-curing tramline 38. This is accomplished by the operation of the long crane loading chain drive 68 at the time the long transfer crane 42 is aligned with the pre-curing line. This short four-rack capacity monorail section adjacent crane loading chain drive 68 is automatically refilled with racks 80 ready for the next loading operation by a forward movement of the precuring and storage chain drives 64 and 66 sufficient to place four (4) racks at a time into the loading position preparatory to loading on the long transfer crane 42.

Obviously, many other modifications and variations of the present invention are possible in light of the above teachings. It is, therefore, to be understood that within the scope of the appended claims the invention may be practiced otherwise than as specifically described.

What we claim is:

1. In an article handling and treating system adapted for use with a block making machine and comprising precuring and unloading co-extensive, elevated tramlines disposed side by side in horizontally spaced, parallel relation, having one end adjacent said machine and the other end adjacent a block treating chamber, an unloading station assosiated with said unloading tramline, block carrying racks suspended from said tramlines wholly below the same, means for loading said racks with blocks from said block making machine, means including said pre-curing tramline for transferring the loaded racks to said block treating chamber and means including said unloading tramline for transferring said racks from said block treating chamber to said unloading station, said pre-curing tramline being continuous and fixed throughout its length and separate means for propelling said racks along said respective tramlines, said propelling means for said pre-curing tramline comprising a plurality of independently operated endless driving chains arranged end-to-end along said tramlines, and all of said chains throughout the length of said tramline being disposed in such closely adjacent relationship that racks propelled along the tramline by one chain may be picked up at the end of said chain and carried along by an adjacent chain.

2. In an article handling and treating system for use with a source of supply for the articles being treated, and comprising an article treating chamber, first and second elevated tramlines disposed in adjacent, side-by-side relation and of substantially the same length, one end of said first tramline lying adjacent said source of supply, article carrying racks constructed to be suspended from and travel along said tramlines, a rack loading station associated with said first tramline, means for conveying the fresh articles from said source of supply to said rack loading station, means for transferring loaded racks from said loading station to said second tramline at a point near one end thereof, means for propelling said loaded racks along said second tramline to the other end thereof, and means for transferring said loaded racks from said other end to and delivering them into said article treating chamber.

3. In an article handling and treating system for use with a source of supply for the articles being treated, and comprising an article treating chamber, first and second elevated tramlines of substantially the same length, one end of said first tramline lying adjacent said source of supply, article carrying racks constructed to be suspended from and travel along said tramlines, a rack loading station and a separate rack unloading station associated with said first tramline and spaced apart horizontally longitudinally of said tramline, means for conveying the fresh articles from said source of supply to said rack loading station, means for transferring loaded racks from said loading station to said second tramline at a point near one end thereof, means for propelling said loaded racks along said second tramline to the other end thereof, a second transfer means for transferring said loaded racks from said other end to and delivering them into said article treating chamber, power-operated means for withdrawing the racks of treated articles from said article treating chamber, means whereby said second transfer means serves to transfer the racks of treated articles so withdrawn to the end of said first tramline remote from said source of supply, and means for propelling said racks along said first tramline to said unloading station.

4. Apparatus for handling and treating articles comprising, in combination, an elevated tramline, a plurality of article carrying racks suspended from and movable along said tramline, each rack having a plurality of vertically spaced shelves, a loading station and a separate unloading station disposed side by side below said tramline and spaced apart lengthwise thereof, a source of supply for the articles being treated, means for conveying articles from said source to said loading station, independent means for raising and lowering racks at each of said stations, mechanism at said loading station for loading articles onto the different shelves of one of said racks, when lowered, means for treating said articles and for causing the racks of treated articles to travel along said tramline, and mechanism for simultaneously moving a rack filled with treated articles to said unloading station, and an empty rack to said loading station.

5. Apparatus for handling and treating articles comprising, in combination, first and second elevated adjacent tramlines, a plurality of article carrying racks suspended from and movable along said tramlines, a loading station and an unloading station disposed side by side below said first tramline, a transfer crane near said loading station and having tracks bridging the space between said two tramlines, whereby said crane may transfer racks from the first tramline to the second, the distance between the centers of the loading and unloading stations being substantially the same as the distance between the center of the loading station and the center of said transfer crane, a source of supply for the articles being treated, means for conveying untreated articles from said source to said loading station, article treating means, means for moving along said second tramline toward said treating means racks of untreated articles delivered to said second tramline by said transfer crane, means for causing racks of treated articles to travel along said first tramline toward said unloading station, and means for simultaneously and accurately moving a rack of treated articles to said unloading station, an empty rack from said unloading station to said loading station, and a rack loaded with untreated articles from said loading station to said transfer crane.

6. A plant for handling and treating articles comprising, in combination, an elevated tramline, article carrying racks suspended from and movable along said tramline, a source of supply for the articles being treated adjacent one end of said tramline, means for loading untreated articles from said source onto said racks, means for causing said loaded racks to travel along said tramline to the opposite end thereof, an article treating chamber having a doorway, a bridge crane movable past the last mentioned end of said tramline to said doorway, means for transferring loaded racks from said tramline onto said crane, and from said crane through said doorway into said article treating chamber, power means for withdrawing the racks of treated articles from sad chamber and loading them onto said crane when in one position, and means for discharging said racks of treated articles from said crane when in another position.

7. In an article handling and treating system adapted for use with a block making machine and comprising pre-curing and unloading co-extensive, elevated tramlines disposed side-by-side in spaced parallel relation, having one end adjacent said machine, and the other end adjacent a block curing chamber, block carrying racks suspended from said tramlines, mechanism for loading said racks with blocks from said block making machine, a first transfer crane adjacent said machine for transferring said loaded racks from the loading position to said pre-curing tramline, and a second transfer crane at the end of said tramlines adjacent said block curing chamber for transferring said loaded racks from said pre-curing tramline to a position in front of said block curing chamber, mechanism for moving said loaded racks from said second transfer crane into and out of said block curing chamber, and means whereby said second transfer crane may also deliver the racks of cured blocks to the adjacent end of said unloading tramline.

8. In an article handling and treating system, an article treating chamber, a source of supply for the articles to be treated, means for conveying articles from said source of supply to said article treating chamber, said means including article carrying racks and a continuous, fixed elevated tramline from which said racks are suspended and along which they can travel, and means for propelling said racks along said tramline, said means comprising a plurality of independently operated endless driving chains arranged end-to-end along said tramline, all of said chains throughout the length of said tramline being disposed in such closely adjacent relationship that racks propelled along the tramline by one chain may be picked up at the end of said chain and carried along by an adjacent chain.

9. Apparatus for handling and treating articles comprising, in combination, first and second elevated adjacent tramlines, a plurality of article carrying racks suspended from and movable along said tramlines, a loading station and an unloading station disposed in longitudinally spaced relation adjacent said first tramline, a transfer crane near said loading station and having tracks bridging the space between said two tramlines, whereby said crane may transfer racks from the first tramline to the second, a source of supply for the articles being treated, means for conveying untreated articles from said source to said loading station, article treating means, means for moving along said second tramline toward said treating means racks of untreated articles delivered to said second tramline by said transfer crane, means for causing racks of treated articles to travel along said first tramline toward said unloading station, and means for simultaneously and accurately moving a rack of treated articles to said unloading station, an empty rack from said unloading station to said loading station, and a rack loaded with untreated articles from said loading station to said transfer crane.

References Cited

UNITED STATES PATENTS

| | | | |
|---|---|---|---|
| 664,260 | 12/1900 | Gaunt | 214—16.18 |
| 1,220,797 | 3/1917 | Tanner | 214—16 |
| 1,595,004 | 8/1926 | Haight | 214—16 |
| 1,599,227 | 9/1926 | Gantvoort | 214—16.4 |
| 2,510,573 | 6/1950 | Gray | 25—2 |
| 2,605,004 | 7/1952 | Grueneberg | 214—16.4 |
| 2,641,371 | 6/1953 | Webster | 198—29 |
| 2,823,811 | 2/1958 | Temple | 214—16.4 |
| 2,869,739 | 1/1959 | Davis | 25—2 |
| 2,885,055 | 5/1959 | Hauek | 214—89 |
| 2,990,069 | 6/1961 | Repasky et al. | 25—2 |

J. SPENCER OVERHOLSER, *Primary Examiner.*

R. D. BALDWIN, *Assistant Examiner.*